United States Patent [19]

Miyata et al.

[11] Patent Number: 4,687,518
[45] Date of Patent: Aug. 18, 1987

[54] METHOD FOR MANUFACTURING PYROGEN-FREE COLLAGEN GELS USEFUL AS CONTACT LENSES

[75] Inventors: Teruo Miyata, Tokyo, Japan; Albert L. Rubin, Englewood, N.J.

[73] Assignee: Optical Corp., Stamford, Conn.

[21] Appl. No.: 795,633

[22] Filed: Nov. 6, 1985

[51] Int. Cl.[4] .......................... C08L 89/00; G02C 7/04
[52] U.S. Cl. .................................. 106/161; 351/160 R
[58] Field of Search ..................... 106/161; 351/160 R

[56] References Cited

U.S. PATENT DOCUMENTS

| | | | |
|---|---|---|---|
| 3,558,262 | 1/1971 | Duffy et al. | 8/94.27 |
| 4,140,537 | 2/1979 | Luck et al. | 106/161 |
| 4,204,992 | 5/1980 | Cruz | 106/161 |
| 4,223,984 | 9/1980 | Miyata | 264/1.1 |
| 4,260,228 | 4/1981 | Miyata | 435/273 |
| 4,273,705 | 6/1981 | Kato | 106/161 |

Primary Examiner—Theodore Morris
Attorney, Agent, or Firm—Felfe & Lynch

[57] ABSTRACT

Pyrogen-free collagen useful for manufacturing soft contact lenses is made by performing all manufacturing process steps under aseptic conditions.

8 Claims, No Drawings

METHOD FOR MANUFACTURING PYROGEN-FREE COLLAGEN GELS USEFUL AS CONTACT LENSES

According to the present invention a pyrogen-free collagen gel is prepared for use as a soft contact lens. The process involves insuring that each step of the process of manufacture is carried out under aseptic conditions.

BACKGROUND OF THE INVENTION

The use of collagen and modified collagen gels for soft contact lens has been described in the art. See for example, U.S. Pat. No. 4,223,984 to Miyata et al and U.S. Pat. No. 4,260,228 to Miyata wherein methods for removing collagen from calfskin and preparing collagen gels for use in soft contact lenses are described. Heretofore, however, a problem presented by such collagen lenses was eye irritation which apparently results from the presence of pyrogens in the collagen gel lens.

It has now been discovered that a pyrogen-free, collagen gel is essential for use in collagen gel contact lenses, particularly when such lenses are intended for extended wear. If the collagen gel is not highly purified and is not pyrogen-free, the lens manufactured from it is irritating to the eyes, causing redness, follicular response, and mucus discharge. Collagen gels which contain pyrogens have heretofore resisted all efforts to render them pyrogen-free after manufacture through treatment with various sterilizing agents. It has now, however, been surprisingly determined that a pyrogen-free condition can be achieved provided each individual process step is carried out in an aseptic manner.

SUMMARY OF THE INVENTION

The subject of the invention is concerned with a method for manufacturing a pyrogen-free atelocollagen gel for use in soft contact lenses using collagen derived from animal skin. The process comprises the following aseptic steps:
(1) removing the corium layer from animal skin under aseptic condition;
(2) washing the corium layer with a sterile pyrogen-free salt solution to remove soluble substances other than collagen;
(3) grinding and dissolving the collagen with an acidic proteolytic enzyme (for example pepsin) in a sterile and pyrogen-free condition;
(4) filtering the dissolved collagen solution through a membrane filter to obtain a clear filtrate;
(5) neutralizing the filtrate using a base to precipitate atelocollagen;
(6) washing the precipitated atelocollagen with a pyrogen-free organic solvent to remove lipid;
(7) drying the atelocollagen precipitate and if necessary sterilizing the precipitate using ethylene oxide gas;
(8) dissolving the dried atelocollagen in a pyrogen-free aqueous solution to a concentration of from 1% to 10% to make a gel useful for contact lens manufacture.

DETAILED DESCRIPTION OF THE INVENTION

The following is a detailed description of the above described method for making sterile and pyrogen-free contact lens grade collagen gel. In the processes from the beginning, i.e., the removal of the corium layer from skin, until the final stage, i.e preparing the final gel for lens manufacturing, all steps must be performed under aseptic conditions, free of all contamination.

EXAMPLE 1

To prepare an animal skin for aseptic collagen removal, the dirty hair is first shaved off using a hair cutter and the muscle on the flesh side is also removed to make the surface flat. It is important that the corium layer of skin be taken out aseptically. Once contaminated, it is impossible to manufacture pyrogen-free collagen suitable for pyrogen-free lens manufacture. After this treatment, the skin is cleaned with pyrogen-free water and then soaked in 70% ethanol overnight to insure the sterility of the surface of the skin.

The corium layer is taken out from the skin by splitting the skin, care being taken that hair root is not contained in the corium layer.

The corium layer is again soaked in 70% ethanol overnight and ground with a mincing machine into disintegrated connective tissue, i.e., corium tissue.

The minced tissue is washed with pyrogen-free 5% sodium chloride to remove soluble protein. A solution of 1M to 3M guanidinine chloride can be used instead of the 5% sodium chloride, but the temperature of washing solution is desirably kept below about 20° C.

After salt extraction, the tissue is washed with pyrogen-free water to remove salts and then dissolved into solution by a pepsin treatment. For the pepsin treatment, the washed tissue is suspended in pyrogen-free water and its pH is adjusted to 3 using hydrochloric acid. Pepsin is then added. Pepsin of a concentration of 0.3 to 1.0% as measured against dry substrate is most desirably used. The pepsin solution also must be sterile and pyrogen-free.

The pepsin treatment is terminated when the collagen solubilized solution can filter through a 1 micron pore size membrane filter and the collagen concentration of the filtrate becomes more than about 98%. Such enzyme-solubilized collagen is telopeptide-poor and is referred to in the art as atelocollagen. See U.S. Pat. No. 4,294,241.

Instead of pepsin solubilization, the atelocollagen can also be solubilized using a proteolytic enzyme obtained from micro-organisms having an enzymic optimum pH below 4.5. Such proteloytic enzyme solubilizes the insoluble collagen of the tissue into solution in the same manner as pepsin. Such enzymes can be obtained from fungi, bacteria and yeast, as is well know to those skilled in the art.

After enzyme solubilization, the solubilized enzyme solution is filtered through membrane filters of from 1 micron to 0.40 micron pore size preferably 0.4 to 0.8 micron. The pH of the filtrate is adjusted to 10–11 and the solution is kept overnight to inactivate the enzyme. Then the pH is readjusted to 7–8 and the atelocollagen precipitate is collected by centrifuge.

The collected precipitate is washed with a mixture of ethanol and ether (50:50) to remove lipids.

After the lipid removal by organic solvent, the atelocollagen is air dried under aseptic air flow.

The dried atelocollagen is placed in a container which is evacuated using a vacuum pump. If necessary ethylene oxide gas for sterilization is introduced into the container and sterilization is performed overnight at room temperature. Ethylene oxide gas treatment can be omitted if the sterility of atelocollagen is assured.

After the final treatment, the atelocollagen is soaked in sterile and pyrogen-free water, then its pH is adjusted to 2.0–4.0 and it is mixed well under a vacuum. The atelocollagen concentration is then adjusted to between 1.0 and 10% This concentration of atelocollagen solution can be formed into soft contact as described in the above cited U.S. patents.

EXAMPLE 2

Four different batches of atelocollagen gel were prepared. The first batch was prepared using the procedure set forth, supra, in Example 1 for manufacturing pyrogen-free atelocollagen. The next three batches were prepared using the conventional collagen gel preparation techniques described in the prior art. The pyrogen content of the collagen in each of the four batches was then measured using a conventional colorimetric endotoxin determination procedure. The measured pyrogen content was as follows:

| Collagen Batch | Pyrogen content |
| --- | --- |
| 1 | 0.2 ng/10 mg collagen |
| 2 | 73 ng/10 mg collagen |
| 3 | 37 ng/10 mg collagen |
| 4 | 25 ng/10 mg collagen |

As is seen, Batch 1 collagen gel, the collagen gel prepared by the process of example 1, has a lower pyrogen content than the other 3 batches by a factor of over 100.

Collagen from each of the four (4) batches was then used for lens preparation according to the process described in U.S. Pat. No. 4,223,984. The collagen lenses were then subjected to clinical tests. Only the lenses prepared from Batch 1 were completely acceptable from a clinical perspective. The lenses prepared using collagen from the 3 batches with higher pyrogen content all caused eye reactions such as mucus discharge.

These results demonstrate that contact lens grade collagen, to be acceptable, must be pyrogen-free, and its pyrogen content should be less than 1 ng / 10 mg collagen

We claim:

1. A method for manufacturing a pyrogen-free atelocollagen gel for use in soft contact lenses which comprises the following aseptic steps:
    (1) removing the corium layer from animal skin under aseptic condition;
    (2) washing said corium layer with a sterile pyrogen-free salt solution to remove soluble substances other than collagen;
    (3) grinding and dissolving the collagen with an acidic proteolytic enzyme in a sterile and pyrogen-free condition;
    (4) filtering the dissolved collagen solution through a membrane filter to obtain a clear filtrate;
    (5) neutralizing the filtrate with a strong base to precipitate atelocollagen;
    (6) washing the precipitated atelocollagen with an organic solvent to remove lipid;
    (7) drying the atelocollagen precipitate;
    (8) dissolving the dried atelocollagen in an aqueous solution to a concentration of from 1% to 10% to make a gel for contact lens manufacture.
2. A method according to claim 1, wherein said skin is bovine, sheep or porcine hide.
3. A method according to claim 1, wherein said aqueous solution and water used for washing, enzyme solubilization and making the collagen gel for lens preparation are sterile and pyrogen free.
4. A method according to claim 1, wherein said acidic proteolylic enzyme is selected from the group consisting of pepsin and enzymes obtained from micro organisms having an optimum pH of less than 4.5.
5. A method according to claim 1, wherein said membrane filter has a pore size of from 0.4 to 0.8 micron.
6. A method according to claim 1, wherein the dried atelocollagen precipitate is sterilized using an ethylene oxide gas treatment, such treatment being performed by introducing said gas into a vacuum container in which said dried atelocollagen is placed at room temperature for more than 10 hours.
7. A method according to claim 1, wherein said atelocollagen gel for contact lens manufacturing is at pH 2.0 to 4.5, transparent and pyrogen-free.
8. A clear, transparent pyrogen-free lens prepared from collagen prepared by the method of claim 1.

* * * * *